United States Patent
Kennedy (10) Patent No.: US 9,841,140 B2
(45) Date of Patent: Dec. 12, 2017

(54) DOOR LINTEL LIFT APPARATUS AND METHOD

(71) Applicant: Jeffery Kennedy, Toney, AL (US)

(72) Inventor: Jeffery Kennedy, Toney, AL (US)

(*) Notice: Subject to any disclaimer, the term of this patent is extended or adjusted under 35 U.S.C. 154(b) by 0 days.

(21) Appl. No.: 15/142,888

(22) Filed: Apr. 29, 2016

(65) Prior Publication Data

US 2016/0319556 A1    Nov. 3, 2016

Related U.S. Application Data (60) Provisional application No. 62/154,171, filed on Apr. 29, 2015.

(51) Int. Cl.
| | |
|---|---|
| *F16M 13/02* | (2006.01) |
| *E04G 23/04* | (2006.01) |
| *E04G 23/02* | (2006.01) |

(52) U.S. Cl.
CPC ....... *F16M 13/022* (2013.01); *E04G 23/0296* (2013.01); *E04G 23/04* (2013.01)

(58) Field of Classification Search
CPC .... F16M 13/022; E04G 23/04; E04G 23/0296
See application file for complete search history.

(56) References Cited

U.S. PATENT DOCUMENTS

| | | | | |
|---|---|---|---|---|
| 2,529,272 A | * | 11/1950 | Yoxall | F23M 7/00 122/499 |
| 2,903,758 A | * | 9/1959 | Hayman | E06B 7/18 292/76 |
| 3,141,533 A | * | 7/1964 | Below | E06B 1/6092 52/126.7 |
| 3,216,678 A | * | 11/1965 | Foedisch | G01M 11/04 248/466 |
| 3,402,509 A | * | 9/1968 | Hagiund | E05D 15/30 16/85 |

FOREIGN PATENT DOCUMENTS

| | | | | | |
|---|---|---|---|---|---|
| FR | 2438722 A1 | * | 5/1980 | ............ | E04G 23/04 |
| GB | 827838 A | * | 2/1960 | ............ | E04G 23/04 |
| GB | 827839 A | * | 2/1960 | ............ | E04G 23/04 |

* cited by examiner

*Primary Examiner* — Jeanette E Chapman
(74) *Attorney, Agent, or Firm* — Burr & Forman LLP; Ryan M. Corbett (57) ABSTRACT

A doorway lintel lift apparatus and method are provided. The door lintel lift apparatus may include two support columns, a lintel that is configured to be attached to the support columns, and that includes a vertical flange and a horizontal flange. The apparatus may include two lift bolts coupled to two end portions of the horizontal flange. The two lift bolts may be configured to respectively raise the two end portions of the horizontal flange. The apparatus may include two rotatable lift nuts that, when rotated, raise the lift bolts to engage and raise the two ends of the horizontal flange.

8 Claims, 7 Drawing Sheets

DOOR LINTEL LIFT APPARATUS AND METHOD

CROSS-REFERENCE TO RELATED APPLICATION

This application claims the benefit of U.S. Provisional Patent Application No. 62/154,171, filed on Apr. 29, 2015, which is incorporated herein by reference in its entirety.

TECHNICAL FIELD

The present disclosure generally relates to a doorway lintel lift system. More particularly, the present disclosure pertains to a lintel lift that can be utilized for fixing old lintels or installing new garage or doorway lintels by providing a reversible cambered angle lintel for supporting old lintels or to install new bricks. The lift may be attached atop a doorway, garage door, or other similar entranceway that supports masonry units.

SUMMARY

The present disclosure relates to the repair of deflected lintels and installation of new lintels that resist deflection. Lintels are used in the construction industry to support masonry units and are generally used over a door or window openings. They are typically made from angle iron, and can vary significantly in length.

A post and lintel technique is commonly used to support loads over door, garage, and window openings. This technique is a simple, yet effective construction technique and is thus used by many architects and builders to support a load above an opening. In the post and lintel technique, two vertical members (or the posts) support a horizontal member (or the lintel) at opposing ends of the horizontal member.

While the conventional post and lintel construction technique is widespread and used considerably, it does suffer from certain drawbacks. Over time, the lintel deflects, or sags, and rotates, resulting in damage to the supporting members and an unsafe positioning of the masonry load, which must be repaired. These repairs are time consuming, labor intensive, and costly. One or more exemplary embodiments may include a lintel system having a cambered angle lintel that can be reversed in order to restore old lintels or to install a new construction.

Heretofore, various types of apparatuses related to lintel installation are known in the prior art. These prior art devices typically provide a lintel support brace that can be utilized for repairing damaged or sagging lintels or part of an original lintel installation. These devices, however, do not provide a chambered angle lintel that can be reversed, about the y-axis, in order to restore old lintels or to install a new construction. One or more exemplary embodiments of the present disclosure may provide a lintel lift that can be utilized for fixing old lintels or installing new garage or doorway lintels. The device according to an exemplary embodiment may include a pair of support columns and a lintel that spans between the pair of support columns.

The pair of vertical support columns may either anchor the apparatus to the floor with foot plates or may be fastened to the existing frame. The horizontal lintel may rest atop a pair of adjustment members that may be hingedly attached to either a base member that spans between the pair of vertical support columns or a flange of the lintel. Lift bolts may be disposed at either end of the adjustment mechanisms, and coupled and locked with the aforementioned adjustment mechanisms. The lift bolts may pass through apertures in the adjustment mechanisms and continue through a lift nut, situated beneath the adjustment mechanism, and terminate in the vertical support column. Rotating the nut raises or lowers the lifting bolt, thereby causing the adjustment mechanisms to raise or lower.

Although the characteristic features of the exemplary embodiments will be particularly pointed out in the claims, the exemplary embodiments may be better understood after a review of the following description, taken in connection with the accompanying drawings wherein like numeral annotations are provided throughout.

DETAILED DESCRIPTION OF EXEMPLARY EMBODIMENTS

Reference will now be made in detail to the following exemplary embodiments, which are illustrated in the accompanying drawings, wherein like reference numerals refer to like elements throughout. The exemplary embodiments may be embodied in various forms without being limited to the exemplary embodiments set forth herein. Descriptions of well-known parts are omitted for clarity.

Figure 1:
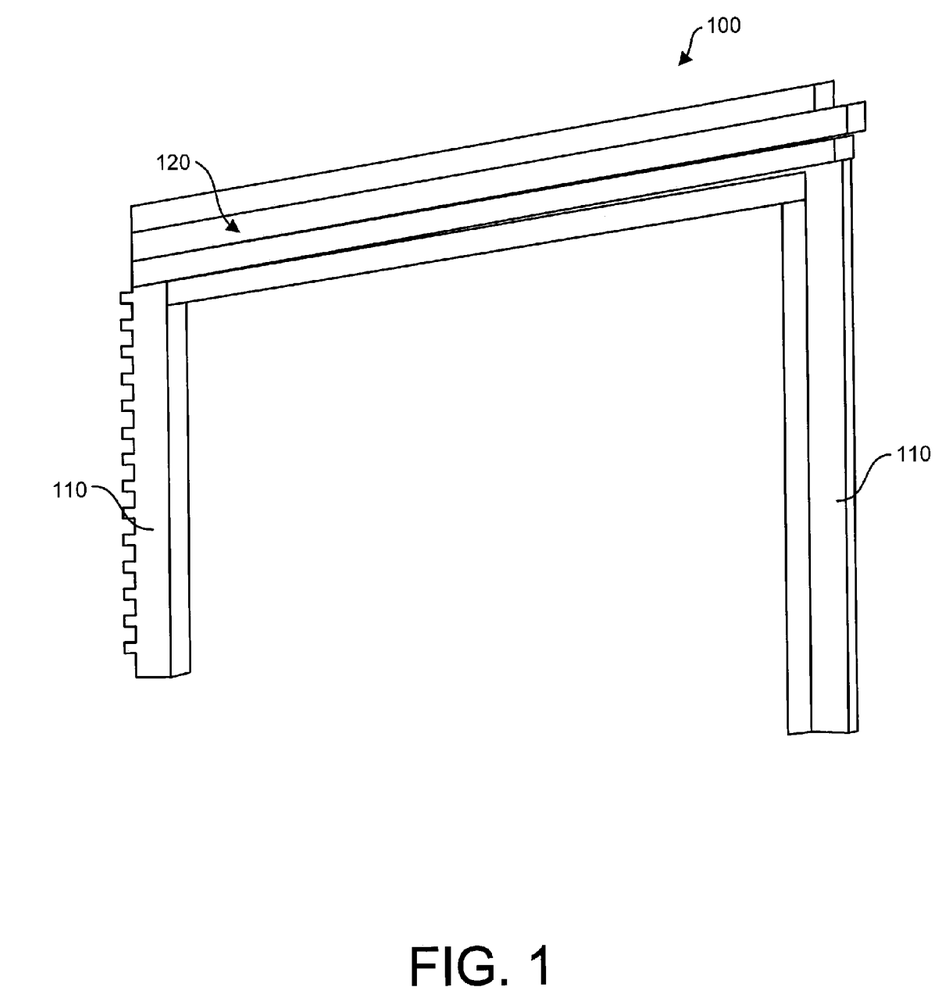
FIG. 1 is a perspective view of the lintel lift system and apparatus according to an exemplary embodiment.

Referring now to FIG. 1, there is a perspective view of the lintel lift apparatus 100 according to an exemplary embodiment. The lintel lift apparatus according to the exemplary embodiment may include a lintel lift that can be utilized for repairing old lintels or installing new garage or doorway lintels. The lintel lift apparatus 100 according to the exemplary embodiment may include a pair of support columns 110 and a cambered angle iron lintel 120 that spans between the pair of support columns 110. The pair of vertical support columns 110 may either anchor the apparatus to the floor with foot plates or may be fastened to the existing frame.

Figure 2:
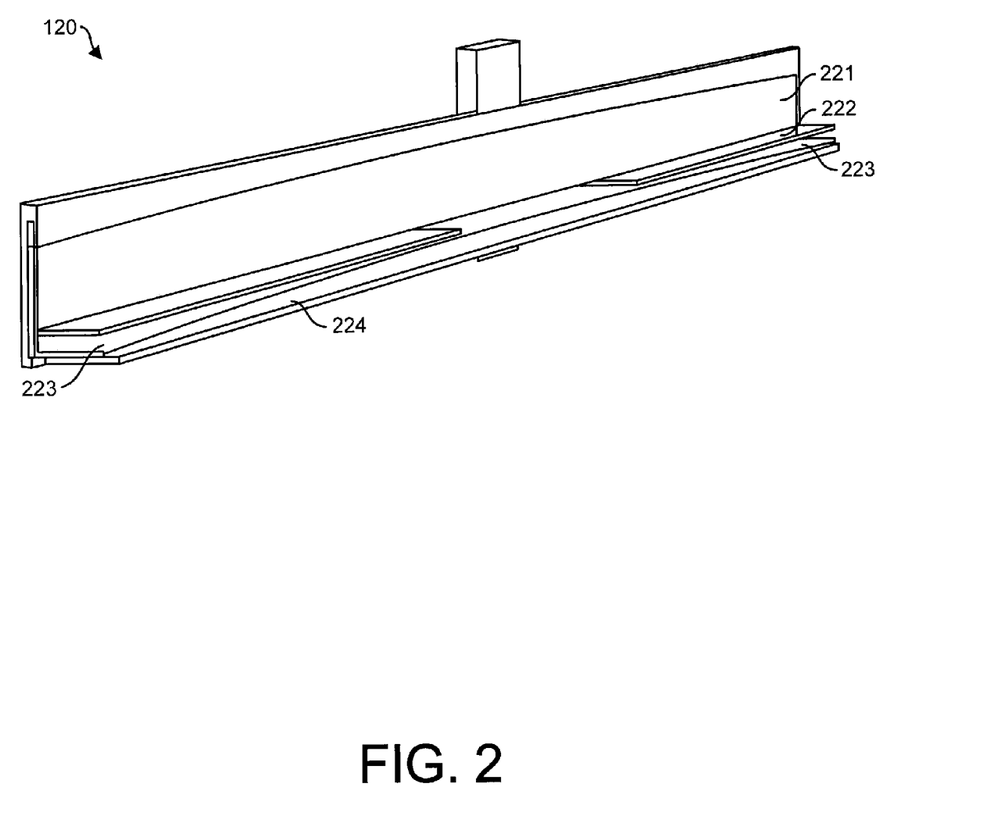
FIG. 2 is a perspective view of the horizontal lintel and adjustment mechanism according to an exemplary embodiment.

Referring now to FIG. 2, there is a perspective view of the horizontal lintel and adjustment mechanism according to an exemplary embodiment. The rolled angle iron lintel 120 may have a substantially shaped "L" shaped cross section comprising a vertical flange 221 and a horizontal flange 223 arranged at approximately a 90 degree angle. The angle iron lintel 120 may be rolled or arched convexly giving it a camber, such that the end portions of the vertical flange 221 are lower than the center portion of the vertical flange 221. Similarly, the end portions of the horizontal flange 223 are lower than the center portion of the horizontal flange 223. With further reference to FIG. 2, the exemplary embodiment may also include a cover, which may include a horizontal cover 224, and a vertical cover 225.

Figure 5:
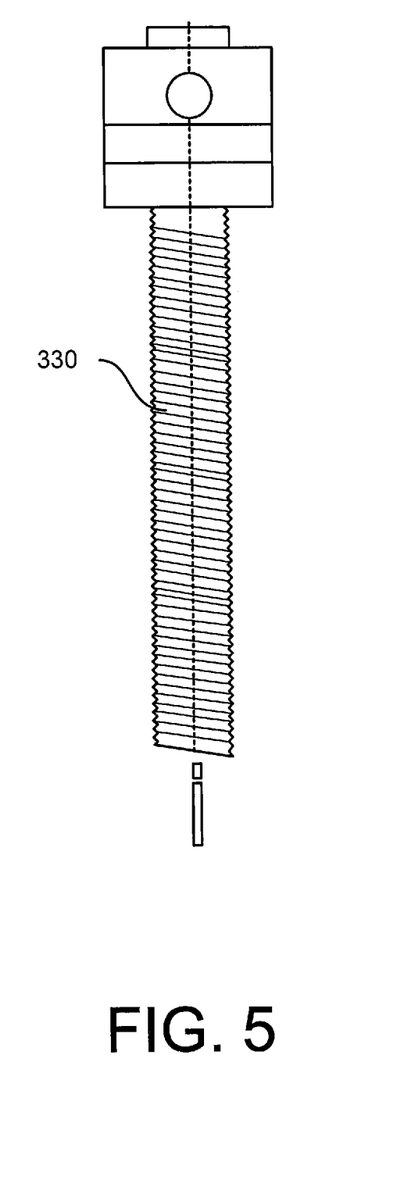
FIG. 5 is a CAD cross sectional view of the lifting bolt in the lintel lift system according to an exemplary embodiment.

In practice, the angle iron lintel 120 is affixed to an existing lintel 222. As shown in FIG. 2, the existing lintel 222 is shown with a center cutout portion so as to not obscure the horizontal flange 223, however the existing lintel 222 is typically one continuous horizontal structure. To repair the existing lintel 222, the angle iron lintel 120 is disposed such that a center portion of the horizontal flange 223 comes into contact with, or is disposed as close as possible to, a center portion of the existing lintel 222. When configured in this manner, there may be a gap between the end portions of the horizontal flange 223 and the respective end portions of the existing lintel 222, as shown in FIG. 2. Disposed at either end of the horizontal flange 223, lift bolts 330 may be coupled and locked with the aforementioned horizontal flange 223. The lift bolts 330 are raised so as to engage the end portions of the horizontal flange 223. The lift bolts 330 raise the end portions of the horizontal flange 223 so that the end portions of the horizontal flange 223 come into contact with the end portions of the existing lintel 222, thereby raising and supporting the end portions of the existing lintel 222. During this process, the horizontal flange 223 may become substantially horizontal such that the end portions of the horizontal flange 223 may not be lower than the center portion of the horizontal flange 223. Likewise, the end portions of the vertical flange 221 may also be raised so that the end portions of the vertical flange 221 may not be lower than the center portion of the vertical flange 221. FIG. 5 shows a cross sectional view of the lifting bolt 330 according to an exemplary embodiment.

Figure 3:
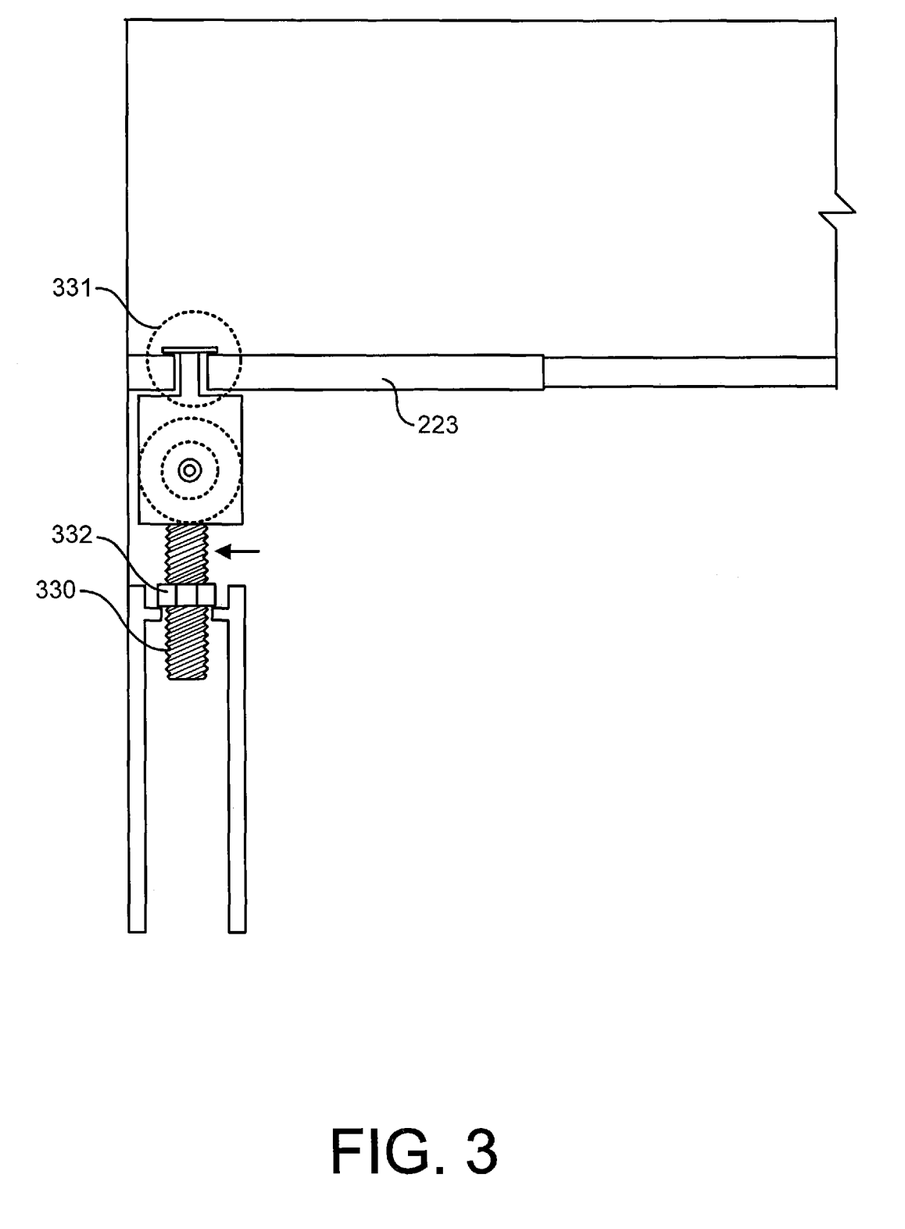
FIG. 3 is an illustrated cross sectional view of the lintel system according to an exemplary embodiment.
Figure 4:
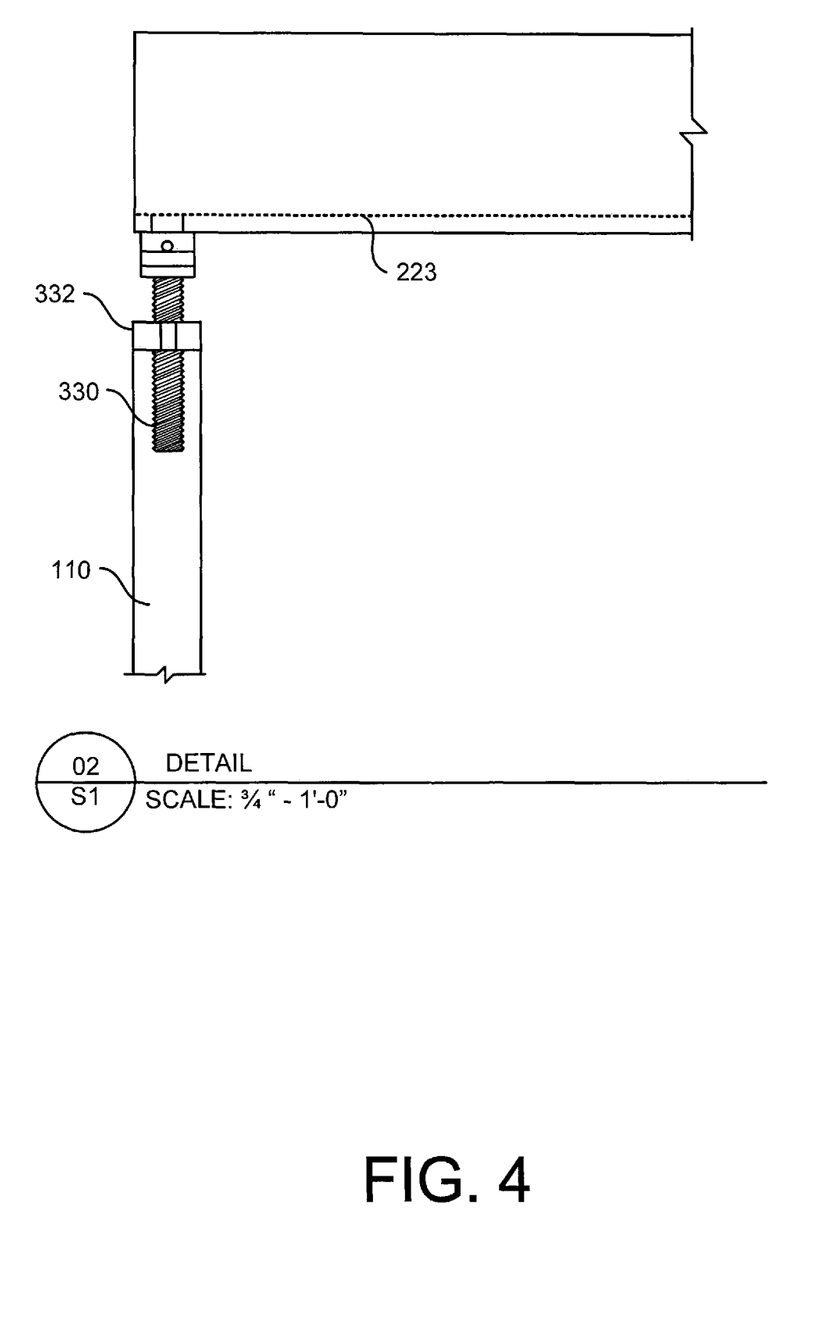
FIG. 4 is a CAD cross sectional view of the lifting bolt and lintel lift system according to an exemplary embodiment.

Referring now to FIG. 3, there is an illustrated cross sectional view of the lintel lift apparatus according to an exemplary embodiment. Each lift bolt 330 may pass through an aperture 331 in the horizontal flange 223 and continue through a lift nut 332, situated beneath the horizontal flange. Now referring to FIG. 4, there is a CAD cross sectional view of the lifting bolt 330 and lintel lift apparatus 100 according to an exemplary embodiment. The lifting nut 330 may terminate in the vertical support column 110. Rotating the nut 332 raises or lowers the lifting bolt 330, thereby causing the horizontal flange 223 to raise or lower.

In operation, the lintel lift apparatus may be used post-construction to retrofit an existing lintel and mason bricks or may be used in the initial construction and installation of mason bricks. During a retrofit, the rolled angle iron lintel 120 may face outwardly and the masonry may be disposed between the vertical flange 221 and the exterior of the existing wall. The pair of vertical support columns 110 may be fastened to the existing doorway frame. The horizontal flange 223 may rest atop the pair of vertical support columns 110. Lift bolts 330 may be disposed at either end of the horizontal flange 223, and may be coupled and locked with the aforementioned horizontal flange 223. Each lift bolt 330 may pass through apertures 331 in the horizontal flange and continue through a lift nut 332, situated beneath the horizontal flange 223, and terminate in the vertical support column 110. Rotating the nut 332 raises the lifting bolt 330, thereby causing the horizontal flange 223 to raise and engage the sagging existing lintel 222 and mason bricks located above the existing lintel 222. Once the lintel system is in place, the sagging existing lintel 222 and bricks located above it are stabilized against future settlement.

During the initial construction and installation, the rolled angle iron lintel 120 may be installed with the lintel facing inwardly. The vertical support columns 110 may be erected and the lift bolts 330 may be installed. Next, cables may be installed that link the lift bolts 330, disposed atop the vertical support column 110, with turnbuckles, which may be temporarily attached to eyebolts disposed at the bottom of each vertical support column 110. The cables can be tightened and the lintel camber angle may be flattened for the addition of bricks. Thereafter, the cables and bolts can be removed and covers can be applied to the columns.

Figure 6:
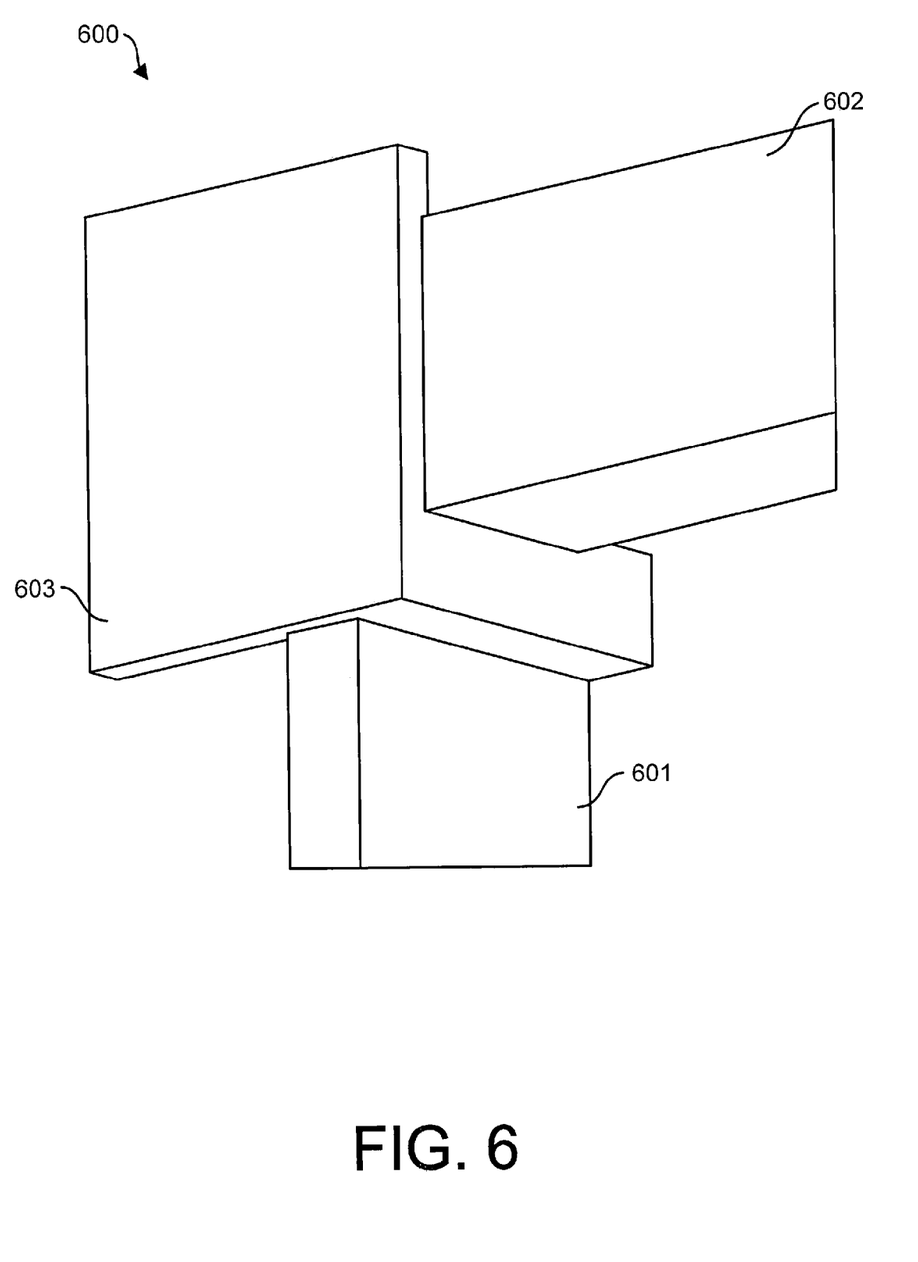
FIG. 6 is a close-up view of the vinyl covers attached to the lintel lift system according to an exemplary embodiment.
Figure 7:
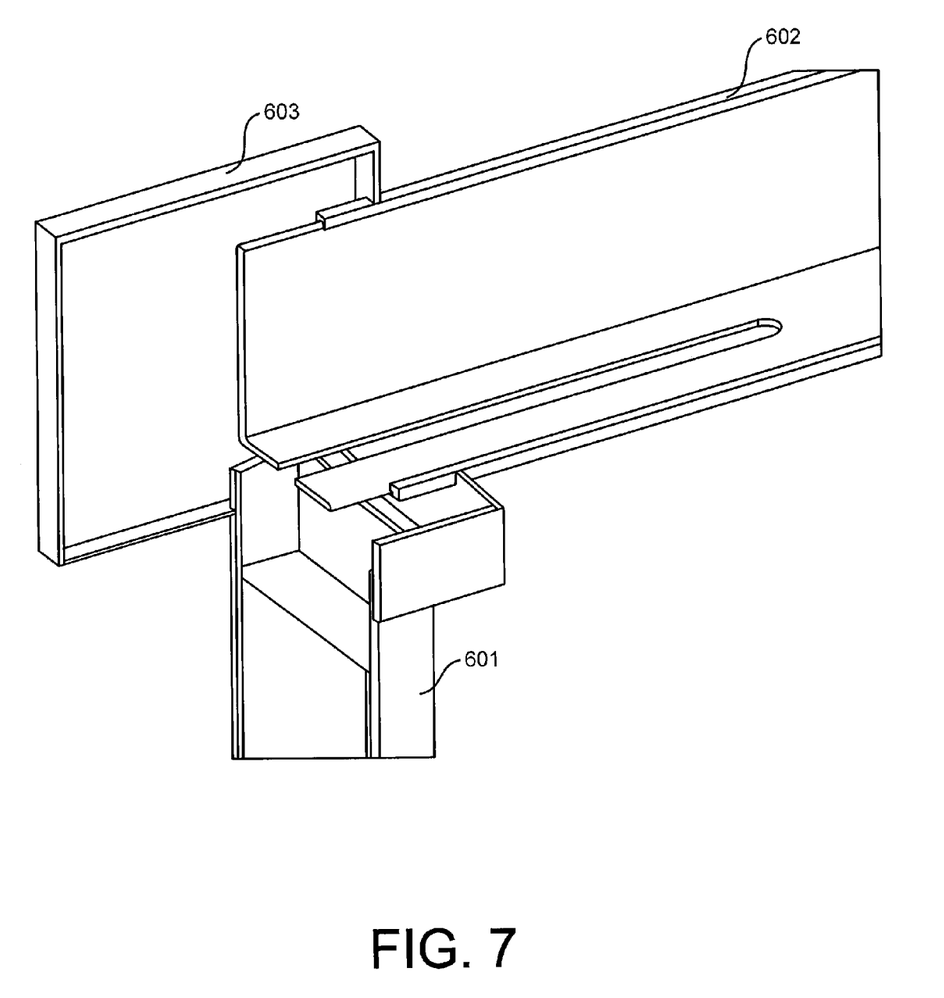
FIG. 7 is a rear exploded view of the lintel lift system vinyl covers according to an exemplary embodiment.

Referring now to FIGS. 6 and 7, there is a close-up view of the covers 600 attached to the lintel lift system and a rear exploded view of the lintel lift system covers, respectfully, according to an exemplary embodiment. The covers may be made of vinyl, or an alternative material may be used. The cover may include three pieces 601, 602, and 603 that are adapted to attach via a snap fit to the vertical support columns, the angle iron lintel 120, and the corner where the vertical support column and horizontal flange of the lintel join, respectively. The covers are designed to cover parts of the lintel lift system that remain exposed after using the lintel system in a retrofit or new construction. Each of the cover pieces includes an edge portion that is sized to press fit on to the angle iron lintel 120 or the vertical support column 110. As shown in FIG. 7, the cover pieces may also include notches that allow the cover pieces to fit together. For example, lintel cover piece 602 may include a notch on the horizontal portion of the cover piece that is configured to receive an upper portion of the vertical support column cover piece 601. Similarly, the corner cover piece 603 may also include a notch that is configured to engage a portion of the vertical support column cover piece 601. Corner cover piece 603 may also include a notch that is configured to engage the vertical portion of cover piece 602.

Although the inventive concepts of the present disclosure have been described and illustrated with respect to exemplary embodiments thereof, it is not limited to the exemplary embodiments disclosed herein and modifications may be made therein without departing from the scope of the inventive concepts.

What is claimed is:
1. A door lintel lift apparatus comprising:
    two support columns configured to be affixed to an existing door structure;
    a lintel that is configured to be attached to the support columns, and that comprises a vertical flange and a horizontal flange; and
    two lift bolts respectively coupled to two end portions of the horizontal flange, wherein the two lift bolts are configured to respectively raise two end portions of the horizontal flange;
    wherein the horizontal flange is arched so that the two end portions of the horizontal flange are below a center portion of the horizontal flange.
2. The door lintel lift apparatus of claim 1, wherein the vertical flange is disposed at approximately a 90 degree angle to the horizontal flange.
3. The door lintel lift apparatus of claim 1, wherein the vertical flange is arched convexly to form a cambered angle.
4. The door lintel lift apparatus of claim 1, wherein the two end portions of the horizontal flange each include an aperture configured to receive one of the lift bolts.
5. The door lintel lift apparatus of claim 4, further comprising two lift nuts;
    wherein the two lift nuts are disposed in the two support columns, respectively, and are configured to receive respective lift bolts of the two lift bolts.
6. The door lintel lift apparatus of claim 5, wherein the two lift nuts are configured to raise the respective lift bolts when the lift nuts are rotated, and thereby raise the respective two end portions of the horizontal flange.

7. The door lintel lift apparatus of claim 1, wherein the two support columns are configured to be affixed to an existing structure or a floor.

8. The door lintel lift apparatus of claim 1, further comprising a cover that is configured to be attached to one or more of the support columns, the lintel, and a corner where one of the support columns and the lintel are coupled.

* * * * *